United States Patent
Krawczyk et al.

[11] Patent Number: 5,785,081
[45] Date of Patent: Jul. 28, 1998

[54] COMPRESSOR INLET VALVE

[75] Inventors: Julie A. Krawczyk, Monroeville; Brian L. Cunkelman, Blairsville, both of Pa.

[73] Assignee: Westinghouse Air Brake Company, Wilmerding, Pa.

[21] Appl. No.: 907,936

[22] Filed: Aug. 12, 1997

[51] Int. Cl.$^6$ .................................................. F16K 15/00
[52] U.S. Cl. ....................... 137/516.23; 137/516.19; 137/516.21
[58] Field of Search ................... 137/516.23, 516.19, 137/516.17, 516.15, 516.13, 516.11

[56] References Cited

U.S. PATENT DOCUMENTS

| | | | |
|---|---|---|---|
| 3,123,095 | 3/1964 | Kohler | 137/516.23 |
| 4,632,145 | 12/1986 | Machu | 137/516.21 |
| 4,643,220 | 2/1987 | Hartshorn | 137/516.13 |
| 4,799,507 | 1/1989 | Hrabal | 137/516.21 |
| 4,869,289 | 9/1989 | Hrabal | 137/516.19 |

Primary Examiner—Denise L. Ferensic
Assistant Examiner—Joanne Y. Kim
Attorney, Agent, or Firm—John B. Sotak

[57] ABSTRACT

An inlet valve assembly for an air compressor and/or compressor-exhauster having a plug member disposed in a cylinder head. A buffer plate screwed onto the lower end of a multi-threaded stud. A spring plate disposed on top of the buffer plate and a guide ring located between the spring plate and a valve plate. An inlet valve seat disposed above the valve plate and a lockout screwed onto an intermediate threaded portion of the multi-threaded stud. An inlet valve unloader slidably mounted on guide bushing and a lockout screwed onto the upper end of the multi-threaded stud. An unloader return spring caged between the inlet valve spring and the inlet valve unloader. A plurality of radially extending tab portions led along the peripheral edge of the buffer plate for preventing parts of the inlet valve from falling into the compressor chamber when the multi-threaded stud breaks.

20 Claims, 3 Drawing Sheets

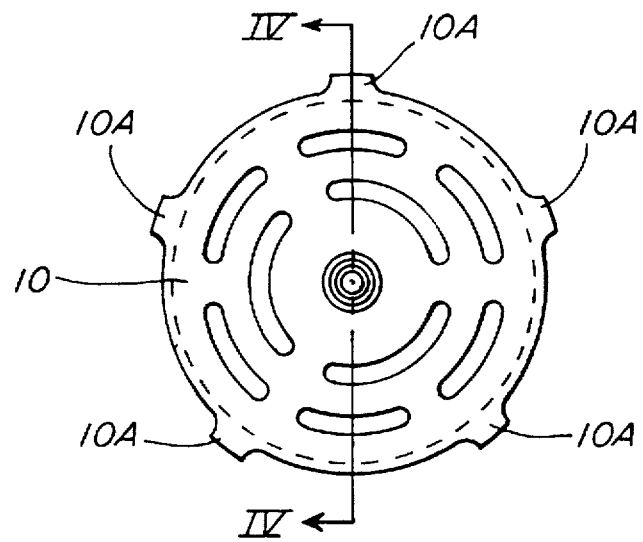
F I G. 3
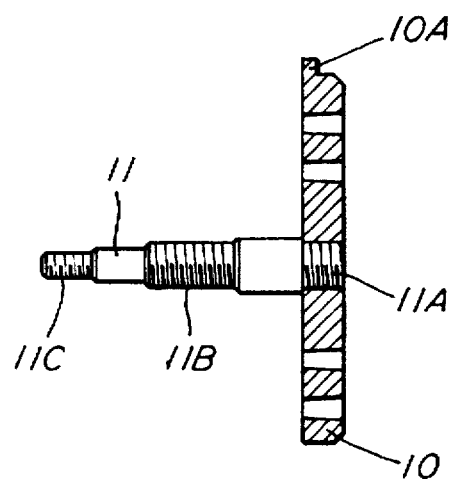
F I G. 4

COMPRESSOR INLET VALVE

FIELD OF THE INVENTION

This invention relates to an improved inlet valve for preventing damage to an air compressor due to the failure of a component and more particularly to a modified inlet valve assembly for an air compressor which avoids destruction to the piston connecting rod and cylinder in the event that the stud breaks on the inlet valve.

BACKGROUND OF THE INVENTION

In certain types of air compressors and combination compressor-exhausters, such as, type 6-CD, manufactured and sold by Westinghouse Air Brake Company, a failure of a certain part can disable the machine on a locomotive. It has been reported recently that a broken stud on the inlet valve allows the buffer plate, the spring plate, the guide ring and the valve plate to fall into the compression chamber of the cylinder. Thus, the top of the reciprocating piston contacts the dislodged valve parts and drives them against the cylinder wall and the underside of the cylinder head. The reciprocating piston attempts to pulverize the broken-away valve parts, however, if a large piece jams against the cylinder head and the piston, the moving piston is immediately stopped on its upward stroke so that the connecting rod is generally broken by the rotating crankshaft. Thus, the air compressor must be removed and replaced so that the locomotive must be taken out of service, which results in the loss of revenue.

OBJECTS AND SUMMARY OF INVENTION

Accordingly, it is an object of this invention to provide a new and improved inlet valve assembly.

Another object of this invention is to provide a modified inlet valve which prevents damage to an air compressor when a stud member breaks.

A further object of this invention is to provide an improved inlet valve assembly including a buffer plate having a plurality of radially extending tab portions which engage an annular ledge to preventing parts of the inlet valve from falling into the compressor chamber when a retaining stud fails.

Yet another object of this invention is to provide a unique inlet valve arrangement in which a buffer plate having a multitude of arms which prevent valve parts from entering the cylinder when a stud member is broken.

Yet a further object of this invention is to provide a new and improved inlet valve for an air compressor which includes a buffer plate having a plurality of radially extending arms which engage an annular ledge formed on the cylinder head to preclude various parts from falling into the cylinder in case a stud member becomes broken.

Still another object of this invention is to provide an inlet valve assembly for an air compressor including a plug member disposed in a cylinder head comprising, a multi-threaded stud, a buffer plate screw-threaded onto the lower end of the multi-threaded stud, a spring plate disposed on top of the buffer plate, a guide ring disposed between the spring plate and a valve plate, an inlet valve seat located above the valve plate, a lock nut screw-threaded onto an intermediate threaded portion of the multi-threaded stud, an unloader return spring caged between the inlet valve seat and an inlet valve unloader, the inlet valve unloader slidable on a guide bushing, a lockout screw-threaded onto the upper end of the multi-threaded stud, and said buffer plate having means for preventing damage to the air compressor in case the multi-threaded stud breaks.

Still a further object of this invention is to provide a new and improved inlet valve assembly for an air compressor which is economical in cost, simple in construction, reliable in operation, dependable in performance, and efficient in use.

DESCRIPTION OF THE DRAWINGS

The above objects and other attendant features and advantages will be more readily appreciated as the present invention becomes better understood by reference to the following detailed description when considered in conjunction with the accompanying drawings, wherein:

FIG. 3 is a top elevation view of the stem and buffer plate of the inlet valve.

FIG. 4 is a side sectional view of the stem and buffer plate taken along line A—A of FIG. 3.

Figure 1:
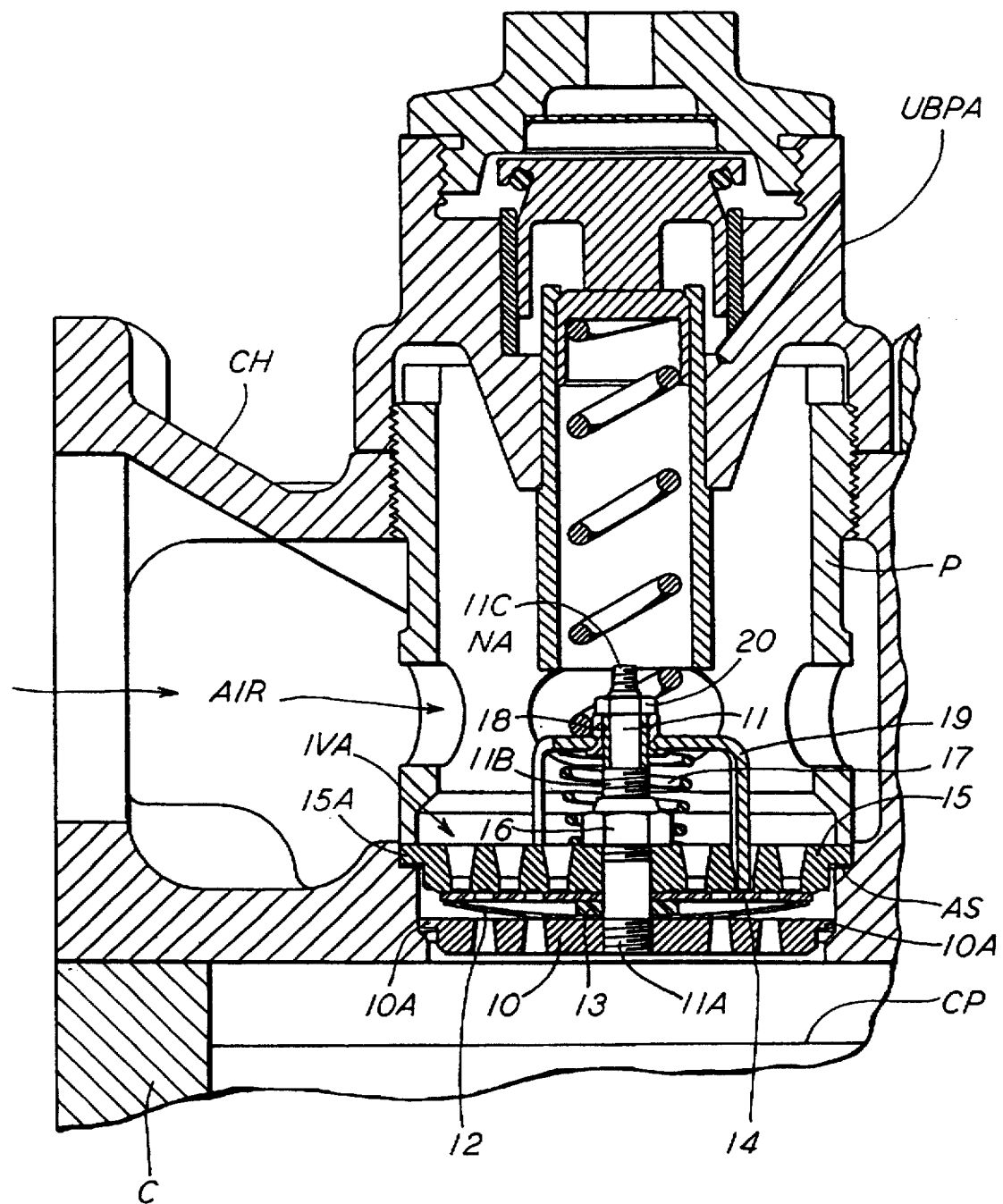
FIG. 1 is a partial cross-sectional view of a high pressure cylinder head and cylinder and the inlet valve assembly of an air compressor.

Referring now to the drawings, and particularly to FIG. 1, there is shown a portion of a 6-CD type of air compressor and/or exhauster-compressor in accordance with the present invention. As shown, the cylinder head CH is suitably mounted to the cylinder C which in turn is mounted to the crankcase. The cylinder head CH accommodates an unloader body and plunder assembly UBPA, an inlet valve plug P and an inlet valve assembly IVA.

Figure 2:
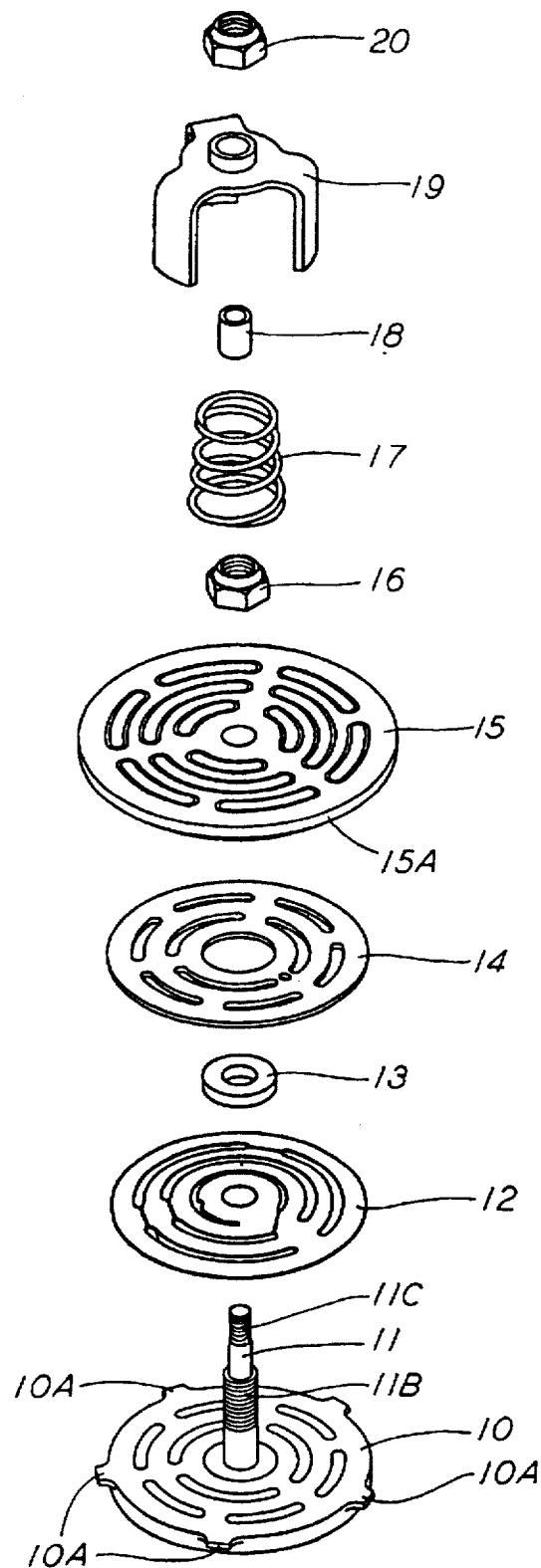
FIG. 2 is an exploded prospective view of the inlet valve assembly.

Referring now to FIGS. 1 and 2, it will be seen that the inlet valve assembly IVA includes a circular buffer plate 10 into which is screwed the lower threaded portion of a multi-threaded retaining stud 11. Next, a circular spring plate 12 is disposed on the retaining stud 11. Then, a guide ring 13 is positioned between the spring plate 12 and a circular valve plate 14. Next, a circular inlet valve seat 15 is placed on top of the valve plate 14 and a locknut 16 is screwed onto the intermediate threaded portion 11b to hold the parts 10, 12, 13, 14 and 15 together. It will be seen that the buffer plate 10, the spring plate 12, the valve plate 14, and the inlet valve seat 15 include a plurality of perforations so that during assembly, the lands must be aligned as shown in FIG. 2. Next, an unloader helical return spring 17 is placed on the upper end of the stud 11. A guide bushing 18 is situated on the non-threaded portion between the intermediate threaded portion 11b and the upper threaded portion 11c. A valve unloader 19 is fitted onto the guide bushing 18 and a locknut 20 is screwed onto the upper threaded portion 11c.

It will be appreciated that after assemblage the inlet valve IVA is placed into the cylinder head CH so that the annular lip 15A inlet valve seat engages an annular shoulder AS formed in the cylinder head CH. At the same time, the placement of the inlet valve assembly IVA causes the radially extending tab or arm portions 10A of the buffer plate 10 to be spaced slightly above an inclined ledge IL formed near the bottom of the cylinder head CH. The tabs 10A fall and rest on the inclined ledge IL when the stud breaks. Normally, the annular lip 15A must contact the annular shoulder AS before the tabs 10A can contact the inclined ledge IL. This is the reason for the gap between the tabs 10A and the chamfer ledge IL. Next, the plug P is screw-threaded into the cylinder head CH and torqued to a given pound-feet.

Finally, the unloader body and plunger assembly UBPA is screw-threaded onto the plug P. During the intake stroke, the valve plate 14 is unseated from the inlet valve seat so that air freely flows from the inlet through the open inlet valve past the buffer plate 10 into the compression chamber. In viewing FIG. 3 and FIG. 4, it will be noted that the buffer plate 10 includes a plurality of radially extending tab portions 10A. In the illustrated embodiment, there are 5 tabs or arms 10A which are symmetrically located around the peripheral of the plate 10. As shown, the tabs OA are disposed on seventy-two-degree (72°) centers around the periphery of the buffer plate 10. It will be appreciated that the diameter of the ledge IL is greater than the diameter of the buffer plate 10 so that intake air flows through the openings and along the outer edge of the buffer plate 10 to maintain the high efficient inlet valve IVA. Conversely, during the exhaust stroke, the inlet valve is closed.

Now if the lower portion of the stud 11 breaks, the valve plate 14, the guide ring 13, and spring plate 12 are entrapped between the inlet valve seat 15 and the buffer plate 10 because of the radially extending tabs 10A. Thus, damage to the piston, cylinder and cylinder head is prevented during failure of the retaining stud 11. For all practical purposes, the air compressor may be repaired without removal from the locomotive simply by removing the broken inlet valve and replacing it with a new inlet valve assembly IVA.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly asserted in what is claimed. It will be understood that variations, modifications, equivalents and substitutions for components of the above specifically-described embodiment of the invention may be made by those skilled in the art without departing from the spirit and scope of the invention as set forth in the appended claims.

We claim:

1. An inlet valve assembly for an air compressor including a plug member disposed in a cylinder head comprising, a multi-threaded stud, a buffer plate screw-threaded onto the lower end of said multi-threaded stud, a spring plate disposed on top of said buffer plate, a guide ring disposed between said spring plate and a valve plate, an inlet valve seat located above said valve plate, a lock nut screw-threaded onto an intermediate threaded portion of said multi-threaded stud, an unloader return spring caged between said inlet valve seat and an inlet valve unloader, said inlet valve unloader slidably mounted on a guide bushing, a locknut screw-threaded onto the upper end of said multi-threaded stud, multi-threaded and said buffer plate having means for preventing damage to the air compressor in case said multi-threaded stud breaks.

2. The inlet valve assembly as defined in claim 1, wherein said buffer plate includes a plurality of radially extending tab portions.

3. The inlet valve assembly as defined in claim 2, wherein said plurality of radially extending tab portions engage an annular lip formed on the cylinder head.

4. The inlet valve assembly as defined in claim 1, wherein said buffer plate prevents said valve plate, said guide ring, said spring plate, said buffer plate, and said broken stud from falling into the cylinder of the air compressor.

5. The inlet valve assembly as defined in claim 2, wherein said plurality of radially extending tab portions are equally angularly spaced around the periphery of said buffer plate.

6. The inlet valve assembly as defined in claim 1, wherein said buffer plate includes five radially extending tab portions.

7. The inlet valve assembly as defined in claim 1, wherein said buffer plate has a circular configuration.

8. The inlet valve assembly as defined in claim 1, wherein said spring plate has a circular configuration.

9. The inlet valve assembly as defined in claim 1, wherein said valve plate has a circular configuration.

10. The inlet valve assembly as defined in claim 1, wherein said inlet valve seat has a circular configuration.

11. The inlet valve assembly as defined in claim 1, wherein said unloader return spring is a helical spring.

12. The inlet valve assembly as defined in claim 6, wherein said five radially extending tab portions are spaced on seventy-two-degree (72°) centers.

13. An Inlet valve assembly for an air compressor and/or compressor-exhauster including a plug member disposed in a cylinder head comprising a buffer plate screw-threaded onto the lower end of a multi-threaded stud, a spring plate disposed on top of said buffer plate, and a guide ring located between the spring plate and a valve plate, an inlet valve seat disposed above the valve plate, and a lock nut screw-threaded onto an intermediate threaded portion of the multi-threaded stud, an inlet valve unloader slidably mounted on guide bushing and a locknut screwed onto the upper end of the multi-threaded stud, an unloader return spring caged between said inlet valve seat and the inlet valve unloader, and a plurality of radially extending tab portions located along the peripheral edge of said inlet valve assembly from falling into the compressor chamber when the multi-threaded stud breaks.

14. The inlet valve assembly as defined in claim 13, wherein the buffer plate has a circular configuration.

15. The inlet valve assembly as defined in claim 13, wherein the spring plate has a circular configuration.

16. The inlet valve assembly as defined in claim 13, wherein the valve plate has a circular configuration.

17. The inlet valve assembly as defined in claim 13, wherein the inlet valve seat has a circular configuration.

18. The inlet valve assembly as defined in claim 13, wherein the plurality of radially extending tab portions are equally spaced around the buffer plate.

19. The inlet valve assembly as defined in claim 13, wherein there are at least five radially extending tab portions.

20. The inlet valve assembly as defined in claim 13, wherein the buffer plate, the spring plate, the valve plate, and the inlet valve seat each includes a plurality of perforations.

* * * * *